United States Patent [19]
Morano et al.

[11] Patent Number: 5,615,949
[45] Date of Patent: Apr. 1, 1997

[54] HIGH PRESSURE MIXING SYSTEM AND PROCESS FOR PRODUCING FOAMED ISOCYANATE-BASED POLYMERS CONTAINING FILLER MATERIAL

[75] Inventors: Nick Morano, Etobicoke; Wilfred W. T. Cheng, Oakville; Mohammad Allohverdi, North York; Anthony G. Di Marco, Woodbridge, all of Canada

[73] Assignee: Woodbridge Foam Corporation, Mississauga, Canada

[21] Appl. No.: 512,683

[22] Filed: Aug. 8, 1995

[51] Int. Cl.$^6$ .............................. B01F 5/04; B01F 15/02
[52] U.S. Cl. .................................... 366/159.1; 366/162.5; 422/133
[58] Field of Search ..................... 366/138, 136, 366/137, 159.1, 162.4, 162.5; 422/133–135

[56] References Cited

U.S. PATENT DOCUMENTS

| | | | |
|---|---|---|---|
| 4,115,066 | 9/1978 | Muhle | 366/162.4 X |
| 4,314,963 | 2/1982 | Boden et al. | 422/135 X |
| 4,379,122 | 4/1983 | Taubermann | 422/133 |
| 4,397,407 | 8/1983 | Skoupi et al. | 366/162.4 X |
| 4,399,104 | 8/1983 | Coblenz et al. | 366/159.1 X |
| 4,399,105 | 8/1983 | Tilgner et al. | 366/159.1 X |
| 4,464,056 | 8/1984 | Schmitz et al. | 366/134 |
| 4,497,579 | 2/1985 | Schmitz et al. | 366/134 |
| 4,503,014 | 3/1985 | Bauer | 422/135 |
| 4,510,120 | 4/1985 | Bauer | 422/133 |
| 4,565,511 | 1/1986 | Ramisch | 425/146 |
| 4,643,581 | 2/1987 | Soechtig et al. | 366/76 |
| 4,721,391 | 1/1988 | Bauer | 366/171 |
| 4,774,059 | 9/1988 | Wagner | 422/131 |
| 4,854,713 | 8/1989 | Soechtig | 366/132 |
| 4,898,714 | 2/1990 | Urban et al. | 422/133 |
| 4,944,599 | 7/1990 | Soechtig | 366/132 |
| 4,966,466 | 10/1990 | Soechtig | 366/132 |
| 5,057,548 | 10/1991 | Urban et al. | 521/170 |
| 5,063,027 | 11/1991 | Schneider | 422/133 |
| 5,157,059 | 10/1992 | Bauer et al. | 521/163 |
| 5,201,580 | 4/1993 | Bauer | 366/159 |
| 5,259,749 | 11/1993 | Meixner et al. | 425/205 |
| 5,270,014 | 12/1993 | Bauer et al. | 422/133 |
| 5,277,567 | 1/1994 | Bauer et al. | 425/130 |
| 5,540,497 | 7/1996 | Addeo et al. | 366/162.5 X |

FOREIGN PATENT DOCUMENTS

| | | | |
|---|---|---|---|
| 3504147 | 8/1986 | Germany | 366/162.5 |

Primary Examiner—Charles E. Cooley
Attorney, Agent, or Firm—Fitzpatrick, Cella, Harper & Scinto

[57] ABSTRACT

A process and system for mixing at least two independent streams in a mixing device having independent inputs for each of the at least two independent streams, comprising structure and steps for: (i) feeding a first stream, provided as a free-flowing solids stream, to a pressure chamber; (ii) compressing the first stream in the pressure chamber; (iii) feeding the first stream to a first input in the mixing device; (iv) feeding a second stream to a second input in the mixing device; (v) impinging the first stream and the second stream on one another in a mixing device to produce a mixture; and (vi) dispensing the mixture from the mixing device; wherein the compressing in Step (ii) is conducted to achieve a substantially linear relationship between a weight of the first stream and a period of impingement of the weight in Step (v). Preferably, the process and system are adapted to produce a filled foamed isocyanate-based polymer (e.g. filled polyurethane foam).

27 Claims, 9 Drawing Sheets

HIGH PRESSURE MIXING SYSTEM AND PROCESS FOR PRODUCING FOAMED ISOCYANATE-BASED POLYMERS CONTAINING FILLER MATERIAL

BACKGROUND OF THE INVENTION

1. FIELD OF THE INVENTION

The present invention relates to a high pressure mixing system and process. More particularly, the present invention relates to a high pressure mixing system and process for producing a foamed isocyanate-based (e.g. polyurethane, polyurea, polyisocyanurate, etc.) polymer containing a filler material.

2. DESCRIPTION OF THE PRIOR ART

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mold the polymer while it is forming and expanding.

One of the conventional ways to produce a polyurethane foam is known as the "one-shot" technique. In this technique, the isocyanate, a suitable polyol, a catalyst, water (which acts as a reactive blowing agent and can optionally be supplemented with one or more blowing agents) and other additives are mixed together at once using, for example, an impingement (i.e. high pressure) mixer. Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixer.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with isocyanate groups. To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e. the polyol in the case of polyurethane, the polyamine in the case of polyurea, etc.).

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g. due to the particle size of the filler material being incompatible with narrow passages, orifices and the like of the equipment).

Typically, when it is desired to load the foamed polymer with a filler material, there are limitations on the process resulting from the increase in the viscosity of the reaction mixture as polymerization and foaming proceed. Additional limitations result from the difficulties encountered in achieving substantially complete wetting-out of filler materials in the case where all ingredients of the reaction mixture (including the filler material) are mixed in one step in a suitable mixhead (i.e. the "one-shot" technique).

A particular difficulty is encountered in the situation where the nature and surface structure of the filler material renders it selectively compatible with some but not all of the ingredients in the reaction mixture. The result of this is that, regardless of whether adequate mixing of ingredients is achieved, there is an imbalance in the physical allocation of the filler material in the foamed polymer product with the filler material essentially agglomerating. This results in non-uniform physical properties in the foamed product. A secondary effect is the relative (and localized) withdrawal of one or more components of the homogeneous, liquid reactant system which may cause catastrophic foam property alterations.

When a filler material is added to any reaction mixture used to produce a foamed isocyanate-based polymer, it is desirable during the process to achieve both (i) uniform distribution of the filler material throughout the polymer matrix, and (ii) intimate contact (both chemical and physical) between the filler material and the isocyanate and active hydrogen-containing compound. The reason for this is that the desired product is a polymer which is cellular in nature and the cells should not be significantly disrupted by the presence of the filler material. The result of not achieving both (i) and (ii) above can cause uncontrolled physical property variations in the resulting foamed product due to an uneven distribution of the filler material. This is particularly a problem in the case when the individual particles of filler material are not separated from each other and the resulting foamed product contains lumps of either "dry" or "wetted" and agglomerated filler material particles.

Attempts have been made to overcome these problems by addition of the filler material to the reaction mixture in specially designed low pressure mixing heads. These mixing heads essentially endeavor to achieve both (i) and (ii) in a single step. While these mixing heads provide for adequate mixing of the filler material and the reaction mixture, they may necessitate alteration of the chemical composition in order to produce an acceptable foam with a high loading of filler. Therefore, it is not typically possible to obtain high loadings of filler material due to the fact that the mixing heads do not provide uniform distribution of the filler material simultaneously with the required intimate mixing (at the molecular level) of the main chemical reactants. The reason for this is that, as the polycondensation reaction proceeds, the viscosity thereof increases resulting in a reduction in the ability to achieve (i) and (ii) above, and the presence of substantial amounts of filler may cause energy loss of the reacting system (i.e. a heat sink effect). Practically, this translates into an inability to achieve filler loading levels of greater than about 17–30% by weight of the polymer reaction mixture without adversely affecting the physical properties of the final foamed polymer product. Furthermore, if the efficiency of mixing the reactants and filler material is inadequate, a separation effect of the filler material (by particle size) is likely to occur resulting in an uneven particle size in the cross-section of the foam mass.

In copending U.S.patent applications Ser. No. 08/007,991 (filed Jan. 22, 1993, now U.S. Pat. No. 5,422,385), and 08/074,966 (filed Jun. 11, 1993 now U.S. Pat. No. 5,432,204), the contents of each of which are incorporated herein by reference, there is disclosed a foamed isocyanate-based polymer containing a filler material, the filler material being present at a level greater than 30% by weight of the polymer and having a specific gravity of less than about 2.0 with proviso that the filler material is not melamine. A process for producing the foamed isocyanate-based polymer is also disclosed. The process comprises the steps of: providing a first mixture comprising water, a catalyst and a filler material, the filler material being wetted by the water and the catalyst; providing a second mixture comprising an isocyanate and an active hydrogen-containing compound; mixing the first mixture and the second mixture to provide a reaction mixture; and allowing the reaction mixture to expand to produce the foamed isocyanate-based polymer. An important aspect of the process is the provision of a second mixture comprising the isocyanate and the active hydrogen-containing compound substantially free of any catalysts or water so that gelling thereof is retarded and no reaction can occur. This results in a second mixture which is a liquid having a viscosity sufficiently low that it may be handled relatively easily using conventional equipment.

While the process described in the '991 and '966 applications is very useful and versatile, there can exist economic difficulties, depending on factors such as the need to use a high pressure mixing system and the like, associated with adapting the process into an economic commercial operation.

Copending U.S.patent application Ser. No. 08/278,549 (filed Jul. 21, 1994, now U.S. Pat. No. 5,523,380), the contents of which are incorporated herein by reference, discloses a system which allows the user to switch between production of: (i) an unfilled or non-filled foamed isocyanate-based polymer, and (ii) a filled foamed isocyanate-based polymer. The filled foamed isocyanate-based polymer is produced in a low pressure mixing device (also referred to as a mixhead).

While the system disclosed in the '549 application is well suited to produce a filled foamed isocyanate-based polymer, production of a such a foam is achieved, for example, by using a low pressure mixhead. Use of a low pressure mixhead facilitates metering of the reactant stream which comprises the particulate filler material surrounded by catalyst/water as a free-flowing solids stream.

To the knowledge of the present inventors, there does not exist a system for mixing multiple reactant streams at high pressure wherein one of the reactant streams to be mixed is a free-flowing solids stream. Such a high pressure mixing system would find immediate application in, for example, in the commercial production of polyurethane foam using the process disclosed in the '991, '966 and '549 applications referred to above.

Thus, it would be advantageous to have a means to mix multiple streams (e.g. reactive streams) at high pressures wherein one of the streams to be mixed is a free-flowing solids stream. Ideally, such a high pressure mixing system would be readily adapted to produce a filled foamed isocyanate-based polymer utilizing a large variety of filler materials and allowing for the introduction of substantially large amounts of filler materials. It would be especially advantageous if such a high pressure mixing system (i) could be adapted to utilize filler materials based on recycled isocyanate-based foams or elastomers or other post-consumer and post-user products (e.g. tires), and (ii) was not limited by the particle size or nature of the filler material.

SUMMARY OF THE INVENTION

It is an object of the present invention to provide a novel process which obviates or mitigates one or more of the above-identified deficiencies of the prior art.

It is another object of the present invention to provide a novel high pressure mixing system for mixing multiple streams wherein one stream to be mixed is a flee-flowing solids stream.

It is yet another object of the present invention to provide a novel process for mixing multiple streams at high pressure wherein one stream to be mixed is a free-flowing solids stream.

It is another object of the present invention to provide a novel high pressure mixing system for mixing multiple reactive streams wherein one reactant stream to be mixed is a flee-flowing solids stream.

it is yet another object of the present invention to provide a process for mixing multiple reactant streams at high pressure wherein one reactant stream to be mixed is a flee-flowing solids stream.

Accordingly, in one of its aspects, the present invention provides a process for mixing at least two independent streams in a mixing device having independent inputs for each of the at least two independent streams, the process comprising the steps of:

(i) feeding a first stream, provided as a free-flowing solids stream, to a pressure chamber;

(ii) compressing the first stream in the pressure chamber;

(iii) feeding the first stream to a first input in the mixing device;

(iv) feeding a second stream to a second input in the mixing device;

(v) impinging the first stream and the second stream on one another in a mixing device to produce a mixture; and (vi) dispensing the mixture from the mixing device;

wherein the compressing in Step (ii) is conducted to achieve a substantially linear relationship between a weight of the first stream and a period of impingement of the weight in Step (v).

In another of its aspects, the present invention provides a system for mixing at least two independent streams in a mixing device having independent inputs for each of the at least two independent streams, the system comprising:

a mixing device having a first input and a second input, the first input capable of receiving a first stream and the second input capable of receiving a second stream, and impingement means for allowing the first stream and second stream to impinge on one another for a period to time;

a compression chamber upstream of the mixing device, the compression chamber comprising: (i) an input for receiving the first stream as a free-flowing solids stream, (ii) compression means to compress the first stream to achieve a substantially linear relationship between a weight of the first stream and the period of time: and (iii) an output for allowing exit of the first stream from the compression chamber;

connection means to connect the output of the compression chamber to the first input in the mixing device.

Applicant has discovered a process and system which make it possible to mix at least two streams at high pressure wherein one of the streams is a free-flowing solids stream. As used throughout this specification, the term "free-flowing solids stream" is intended to mean a stream of solid state material which is non-fluid and is made up of discrete particles of solid material. Practically, the free-flowing solids stream will take the form of particulate solid material. Thus, a suspension compressing, for example, a filled liquid stream is outside the scope of "free-flowing solids stream" as used herein.

In the context of the present invention, the term "high pressure" is intended to mean a pressure of at least 500 psi. Practically, in the current state of the art, the pressure is in the range of from about 500 to about 15,000 psi, however higher pressures are contemplated. A process and system to mix at least two streams which each normally behave as fluids or liquids are known. Conventionally, the liquid streams are fed using known pumps and valves at a pressure of from about 500 to about 3,000 psi to a mixhead wherein they impinge on one another resulting intimate mixing thereof. However, to the knowledge of the present inventors, a commercially available high pressure process and system for mixing at least two streams wherein one of the two streams to be mixed is a flee-flowing solids stream has heretofore been unknown.

Applicant has discovered that prior to mixing, it is necessary to compress the free-flowing solids stream to achieve a substantially linear relationship between the weight of the sample of the free-flowing solids stream and the period of time required for that weight to impinge with the second stream. Practically, the necessary compression can be readily determined by predetermining either the weight of the sample of the free-flowing solids stream and measuring the time necessary to impinge the sample or by predetermining the time necessary to impinge the sample and measuring the weight of the free-flowing solids stream passing through the mixing device to achieve impingement. By compressing the free-flowing solids stream in this manner, it is possible to make it behave in a manner substantially the same as a fluid with regard to facilitating pumping, and metering and mixing thereof with at least one other stream.

While the precise pressure used to achieve the necessary compression depends on a number of factors (e.g. nature of solids, hardness of solids, average particle size of solids, angle and size of opening/nozzle at exit of pressure chamber or entry of mixing device, coefficient of friction of the solids being compressed, etc.), it has been found that a pressure in the range of from about 500 to about 15,000 psi is suitable. Preferably, the pressure is in the range of from about 2,000 to about 15,000 psi, more preferably from about 3,000 to about 10,000 psi, most preferably from about 3,000 to about 5,000 psi.

A particularly advantageous embodiment of the invention relates to compressing the free-flowing solids stream in a hydraulic intensifier. The advantage of using such an intensifier is that it can operate using conventional hydraulic pressure (up to 3,000 psi) and deliver an output pressure which is a multiple thereof. Specifically, pressurized hydraulic fluid enters the intensifier and acts on a driving surface of a confined piston which drives a ram or piston having a smaller working surface resulting in provision of a given output volume at a considerably higher pressure than the input pressure. By judicious selection of the surface areas of the driving surface and the working surface, it is possible to achieve a hydraulic ratio (defined as the ratio of the surface area of the driving surface to the surface area of the working surface) of at least 1:1. Preferably, the hydraulic ratio is in the range of from about 2:1 to about 10:1, more preferably from about 3:1 to about 7:1. This embodiment of the invention facilitates incorporation of the present process and system into an existing commercial operation for the producing of, for example, polyurethane foam.

Of course, those of skill in the art will appreciate that the intensifier can be replaced with, for example, a direct drive gear or other type of pump capable of providing the necessary output to create sufficient pressure in the pressure chamber.

BRIEF DESCRIPTION OF THE DRAWING

Embodiments of the present invention will be described with reference to the accompanying drawings, in which.

DESCRIPTION OF THE PREFERRED EMBODIMENTS

Ideally, the present process and system are adapted to produce a filled foamed isocyanate-based polymer. As used throughout this specification, the term "isocyanate-based polymer" is intended to mean, inter alia, polyurethane, polyurea and polyisocyanurate. Thus, while the preferred embodiments of the invention will be described with reference to the production of a filled foamed isocyanate-based polymer, it will, however, be appreciated by those of skill in the art the present process and system can have a more widespread applicability and can be used in virtually any instance where it is desired to mix, at high pressure, at least two streams wherein one of the streams to be mixed is a free-flowing solids stream. The present system and process are particularly advantageous when it is desired to mix two or more reactive streams. Thus, for example, the present process and system could be used to in a reaction injection molding of elastomers, a coal fired combustion furnace (e.g. for use in power generation) wherein particulate coal is mixed with air to provide a combustible mixture, a foundry operation and the like.

A particularly preferred aspect of this invention relates to a process for producing a foamed isocyanate-based polymer which has an unusually high level of filler material. Filler material loading levels as high as 70% by weight based on the weight of the final foamed polymer are contemplated. Preferably, the loading of the filler material is in the range of from about 30% to 70% by weight, more preferably from about 30% to about 60% by weight, even more preferably from about 30% to about 50% by weight, most preferably from about 30 to about 45% by weight, based on the weight of the final foamed polymer. Preferably, the specific gravity of the filler material for use in the present process is in the range of less than about 2.0, preferably in the range of from about 0.02 to about 1.5. Non-limiting examples of suitable such filler materials include: ground polymer (filled or unfilled), ground sheet molding compound, ground reaction injection molded (RIM) isocyanate-based elastomer, ground reinforced reaction injection molded (RRIM) elastomer, ground whole tire or a portion thereof and ground isocyanate-based polymer foam (foam powder).

An embodiment of the present invention is related to a process for the production of a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

The present process involves mixing at least two independent streams in a mixing device having independent inputs for each the independent streams.

Step (i) in the process involves feeding a first stream to a pressure chamber. The first stream normally behaves as a free-flowing solids stream. The manner by which the first stream is fed to the pressure chamber is not particularly restricted and can be done using a hopper, conveyor, auger screw and any combination of these.

When it is desired to produce a filled foamed isocyanate-based polymer, it is preferred that the free-flowing solids stream comprises a filler material surrounded by a mixture comprising a blowing agent and a catalyst. Preferably the blowing agent comprises water. As is known in the art water can be used as a reactive blowing agent in the production of foamed isocyanatebased polymers. Specifically, water reacts with the isocyanate forming carbon dioxide which acts as the effective blowing agent in the final foamed polymer product. Optionally, blowing agents may be used in conjunction with water. The catalyst used in the first stream is a compound capable of catalyzing the polymerization reaction. Such catalysts are known, and the choice and concentration thereof is within the purview of a person skilled in the art. See for example U.S. Pat. Nos. 4,296,213 and 4,518,778, the contents of each of which is incorporated herein by reference. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used. The choice of particulate filler material for use in the preferred embodiment of the first stream of the present process is not particularly restricted provided that the filler material (directly or indirectly) does not substantially poison the polycondensation reaction. Preferably, the filler material is substantially non-cellular. Non-limiting examples of filler material include minerals, ores, synthetic materials (both organic and polymeric), and the like. This preferred embodiment of the present process is particularly well suited for use with a filler material selected from the group comprising post-consumer and post-user articles—in this scenario these articles may be effectively recycled using the present process. Non-limiting examples of such articles include plastics, tires, and isocyanate-based foams and elastomers (filled and unfilled). Typically the filler material will be used in a particulate form and will have a suitable shape (e.g. microspherical, etc.). The choice of filler material may be dictated by the desired properties of or intended application for the foamed product; for example, as follows:

| Filler Material | Application/Property Conferred To Foam |
| --- | --- |
| 1. Fibrous | Porous, breathability, tear, special effects |
| 2. Expandable beads | Flotation, energy management |
| 3. Metallized fibres/powders | Conductivity |
| 4. Carbon black coated flakes/powders | Conductivity |
| 5. Microwave sensitive powders | Thermoformability |
| 6. Metallic fillers | Conductivity |
| 7. Heavy fillers | Sound attenuation |
| 8. Organic salts | Mold releasing |
| 9. Thermosensitive fillers | Thermoformability |

The preparation of such a first stream can be achieved using, in combination, a conventional solids mixer, a hopper and a solids metering device.

Step (ii) of the present process comprises compressing the first stream in the pressure chamber at a pressure sufficient to achieve a substantially linear relationship between the weight of a sample of the first stream and period of time to impinge the sample in Step (v) of the process. The preferred manner of achieving such pressures is to use a pressure chamber incorporated in a hydraulic intensifier. Such a hydraulic intensifier is commercially available from Parker Motion & Control under the tradename Parker Fluidpower Intensifier. Preferably, the hydraulic intensifier is capable of providing a hydraulic ratio of at least about 1:1, more preferably in the range of from about 2:1 to about 10:1, most preferably in the range of from about 3:1 to about 7:1.

Step (iii) of the present process comprises feeding the first stream to a first input in the mixing device. The manner by which this is achieved is not particularly restricted and is within the purview of a person skilled in the art. In order to facilitate pumping of the stream, it is preferred that a line substantially free of sharp curves and corners is used to connect the output of the compression chamber and the first input of the mixing device.

Step (iv) of the present process comprises feeding a second stream to a second input in the mixing device. Again, the manner by which this is achieved is not particularly restricted and is within the purview of a person skilled in the art.

When it is desired to produce a filled foamed isocyanate-based polymer it is preferred to utilize a second stream comprising an isocyanate, an active hydrogen-containing compound and any other additives provided that the blowing agent and catalyst are present in the first stream discussed above. Thus, it is possible to produce a filler foamed isocyanate-based polymer by using a second stream which comprises a pre-blend of isocyanate and active hydrogen-containing compound provided that appropriate measures are taken to prevent reaction between these components. Alternatively, it is possible to feed isocyanate and active hydrogen-containing compounds as independent streams to the mixing device.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent No. 1,482,213, the contents of which are incorporated herein by reference. The most preferred polyol is a polyether polyol. Preferably, such a polyether polyol has a molecular weight in the range of from about 200 to about 10,000, more preferably from about 2,000 to about 7,000, most preferably from about 2,000 to about 6,000.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 1500, a functionality of from 2 to 6, and an amine equivalent weight of from about 200 to about 6000. Such amine terminated polyethers are typically made from an appropriate initiator to which a lower alkylene (e.g. ethylene, propylene, butylene and mixtures thereof) oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The isocyanate suitable for use in the preferred embodiment of the present process is not particularly restricted and the choice thereof is within the purview of a person skilled in the art. Generally, the isocyanate compound suitable for use may be represented by the general formula:

$Q(NCO)_i$ wherein i is an integer of two or more and Q is an organic radical having the valence of i. Q may be a substituted or unsubstituted hydrocarbon group (e.g. an alkylene or arylene group). Moreover, Q may be represented by the general formula:

$Q^1—Z—Q^1$ wherein $Q^1$ is an alkylene or arylene group and Z is chosen from the group comprising —O—, —O—$Q^1$—, —CO—, —S—, —S—$Q^1$—S— and —$SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention relates to the production of polyurea foams, it will be appreciated that in this embodiment, the prepolymer would be used to prepare a polyurethane modified polyurea (i.e. not an unmodified polyurethane) foam.

In another embodiment, the isocyanate compound suitable for use in this preferred embodiment of the process of the present invention may be selected from dimers and trimers of isocyanates and diisocyanates, and from polymeric diisocyanates having the general formula:

$[Q''(NCO)_i]_j$ wherein both i and j are integers having a value of 2 or more, and Q" is a polyfunctional organic radical, and/or, as additional components in the reaction mixture, compounds having the general formula:

$L(NCO)_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides $(QSO_2NCO)$, cyanic acid and thiocyanic acid.

See also for example, British patent No. 1,453,258, the contents of which are incorporated herein by reference.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate. An example of such an isocyanate is commercially available from Imperial Chemical Industries under the tradename Rubinate M and from The Dow Chemical Company under the tradename PAPI 4027.

For reasons which will be described below with reference to the drawings, a preferred embodiment of the present process comprises the further step of feeding a third stream to a third port in the mixing device. This allows for provision of separate pre-blended streams of the isocyanate and the active hydrogen-containing compound to the respective inputs in the mixing device (again, is this embodiment, the isocyanate and active hydrogen-containing compound are substantially unreacted). A further advantage is that water, a non-limiting example of a blowing agent, and catalyst may be used exclusively in the first stream as contemplated by the '991 and '996 applications discussed above.

It is known in the art that the amount of water used as a blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. Since the amount of water used in the production of a foamed isocyanate-based polymer is limited by the fixed properties expected in the foamed polymer and by the tolerance of the expanding foam towards self structure formation, it may be necessary, in certain circumstances, to utilize a substantially inert liquid extenders when high loadings of filler material are contemplated. Non-limiting examples of suitable liquid extenders include halogenated hydrocarbons and high molecular weight hydrocarbons. A portion of the polyol may be used as supplementary carrier.

As will be clearly understood by those of skill in the art, when it is desired to exercise the preferred embodiment of the present process to produce a filled foamed isocyanate-based polymer, it is contemplated that conventional additives in the isoocyanate-based polymer art be used in the process. Non-limiting examples of such additives include: surfactants (e.g. organo-silicone compounds available under the tradename L-540 Union Carbide or DC 5043 from Air Products), cell openers (e.g. silicone oils), extenders (e.g. halogenated paraffins commercially available as Cereclor S45), cross linkers (e.g. low molecular weight reactive hydrogen-containing compositions), pigments/dyes, flame retardants (e.g. halogenated organo-phosphoric acid compounds), inhibitors (e.g. weak acids), nucleating agents (e.g. diazo compounds), anti-oxidants, and plasticizers/stabilizers (e.g. sulphonated aromatic compounds). One or more of these additives may be used in the first stream or the second stream in the present process. The amounts of these additives conventionally used would be within the purview of a person skilled in the art.

Step (v) of the present process comprises impinging the first stream, the second stream and the third stream (if present) in the mixing device. Step (vi) comprises dispensing the mixture from the mixing device.

The mixing device suitable from use in the present process and system comprises a first input, a second input and, optionally, a third input, to receive the first stream, the second stream and, optionally, the third stream, respectively. With regard to the second input and the third input, if present, the mixing device may be of the type, for example, disclosed in one or more of the following patents:

U.S. Pat. No. 4,379,122 (Taubenmann)
U.S. Pat. No. 4,464,056 (Schmitz et al.)
U.S. Pat. No. 4,497,579 (Schmitz et al.)
U.S. Pat. No. 4,503,014 (Bauer)
U.S. Pat. No. 4,510,120 (Bauer)
U.S. Pat. No. 4,565,511 (Ramisch)
U.S. Pat. No. 4,643,581 (Soechtig et al.)
U.S. Pat. No. 4,721,391 (Bauer)
U.S. Pat. No. 4,774,059 (Wagner)
U.S. Pat. No. 4,854,713 (Soechtig)
U.S. Pat. No. 4,898,714 (Urban et al.)
U.S. Pat. No. 4,944,599 (Soechtig)
U.S. Pat. No. 4,966,466 (Soechtig)
U.S. Pat. No. 5,057,548 (Urban)
U.S. Pat. No. 5,063,027 (Schneider)
U.S. Pat. No. 5,157,059 (Bauer et al.)
U.S. Pat. No. 5,201,580 (Bauer)
U.S. Pat. No. 5,277,567 (Bauer et al.)
U.S. Pat. No. 5,270,014 (Bauer et al.)

the contents of each of which are hereby incorporated by reference. Generally, a preferred mixing device for use in the present process and system comprises a control plunger disposed in a mixing chamber. The control plunger is operable in: (i) a retracted position to allow the first stream, the second stream and the third stream, if present, to impinge on one another in the mixing chamber, and (ii) an extended position which prevents entry of the first stream, second stream and the third stream, if present, into the mixing chamber.

The mixing device is adapted to include the first input for receiving the first stream (i.e. the stream originally fed as a free-flowing solids stream). Preferably, the first input is designed such that the first stream is dead-ended or dead-headed against the control plunger when the control plunger is in the extended position. Preferably, the control plunger comprises an independent recirculation passage or groove therein in communication with the second input of the mixing device when the control plunger is in the extended position allowing for recirculation of second stream. If the a third stream is being utilized, it is preferred that the control plunger comprise another independent recirculation passage or groove therein in communication with the third input of the mixing device.

As will be apparent to those of skill in the art, the process of the present invention is useful in the production of molded articles (e.g. automotive seat systems) and the like.

Figure 1:
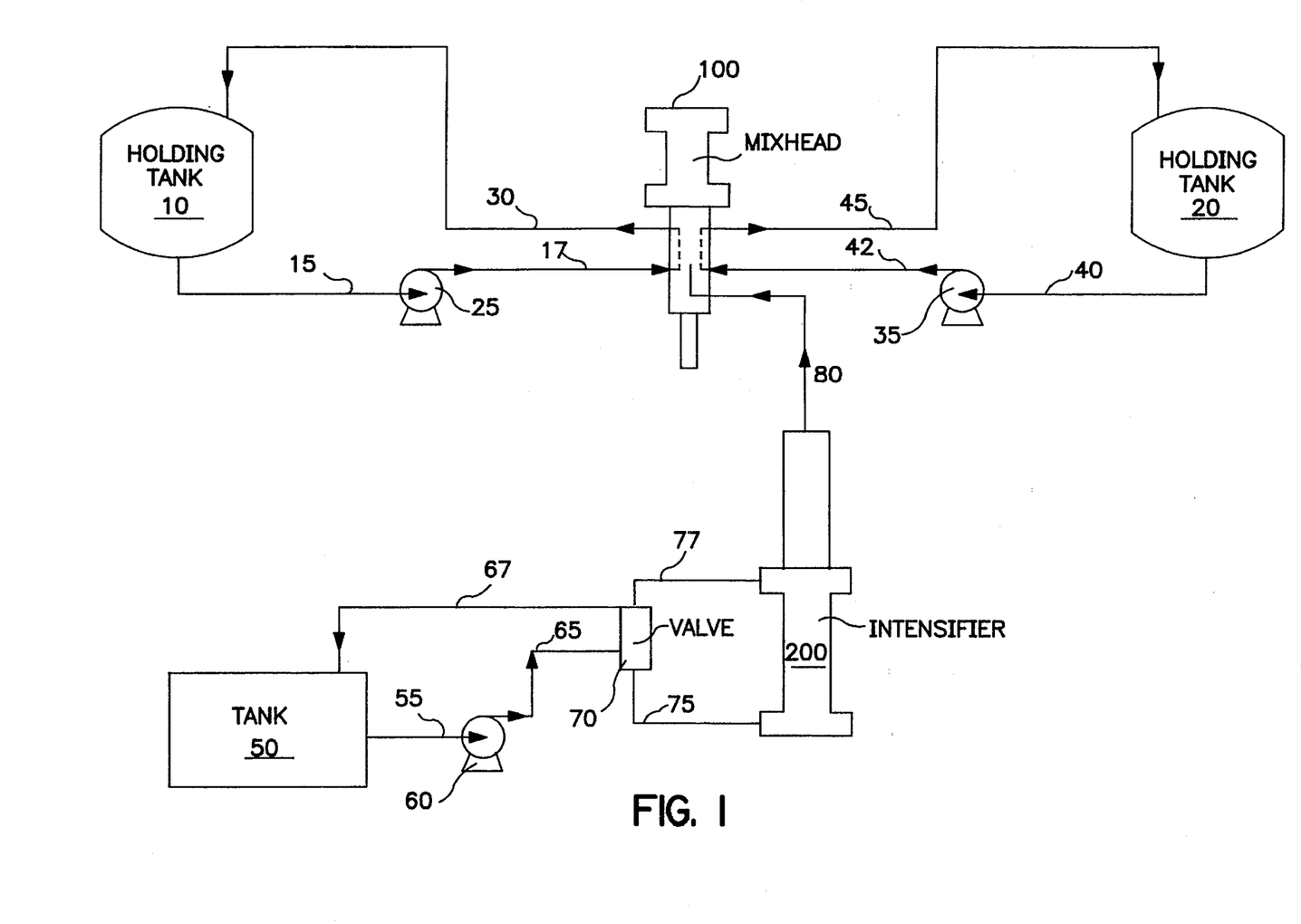
FIG. 1 illustrates a schematic of a preferred embodiment of the present process and system.

With reference to FIG. 1, there is illustrated a schematic of an embodiment of the present process and system. The illustrated embodiment is for mixing three independent streams wherein one of the streams is provided as a free-flowing solids stream. This embodiment has particular application to produced a filled foamed isocyanate-based foam.

Thus, there is provided a first holding tank 10 containing a first liquid stream and a second holding tank 20 containing a second liquid stream. The first liquid stream and the second liquid stream each comprise a blend of an isocyanate and an active hydrogen-containing compound. The first liquid stream is withdrawn from first holding tank 10 by a first pump 25 via a line 15. The first liquid stream is fed to a high pressure mixhead 100 which will be described in more detail hereinafter via a line 17. A first return line 30 connects mixhead 100 to first holding tank 10. The second liquid stream is withdrawn from second holding tank 20 by a second pump 35 via a line 40. The second liquid stream is fed to high pressure mixhead 100 via a line 42. A second return line 45 connects mixhead 100 to second holding tank 20.

As illustrated, there is also provided a hydraulic tank 50 containing hydraulic fluid. The hydraulic fluid is withdrawn from hydraulic tank 50 by a pump 60 via a line 55. A directional control valve 70 is provided and is connected to pump 60 via line 65. A line 67 returns hydraulic fluid from valve 70 to hydraulic tank 50. Lines 75,77 are connected from valve 70 to intensifier 200. The operation of valve 70 and lines 75,77 is within the purview of a person skilled in the art.

Figure 2:
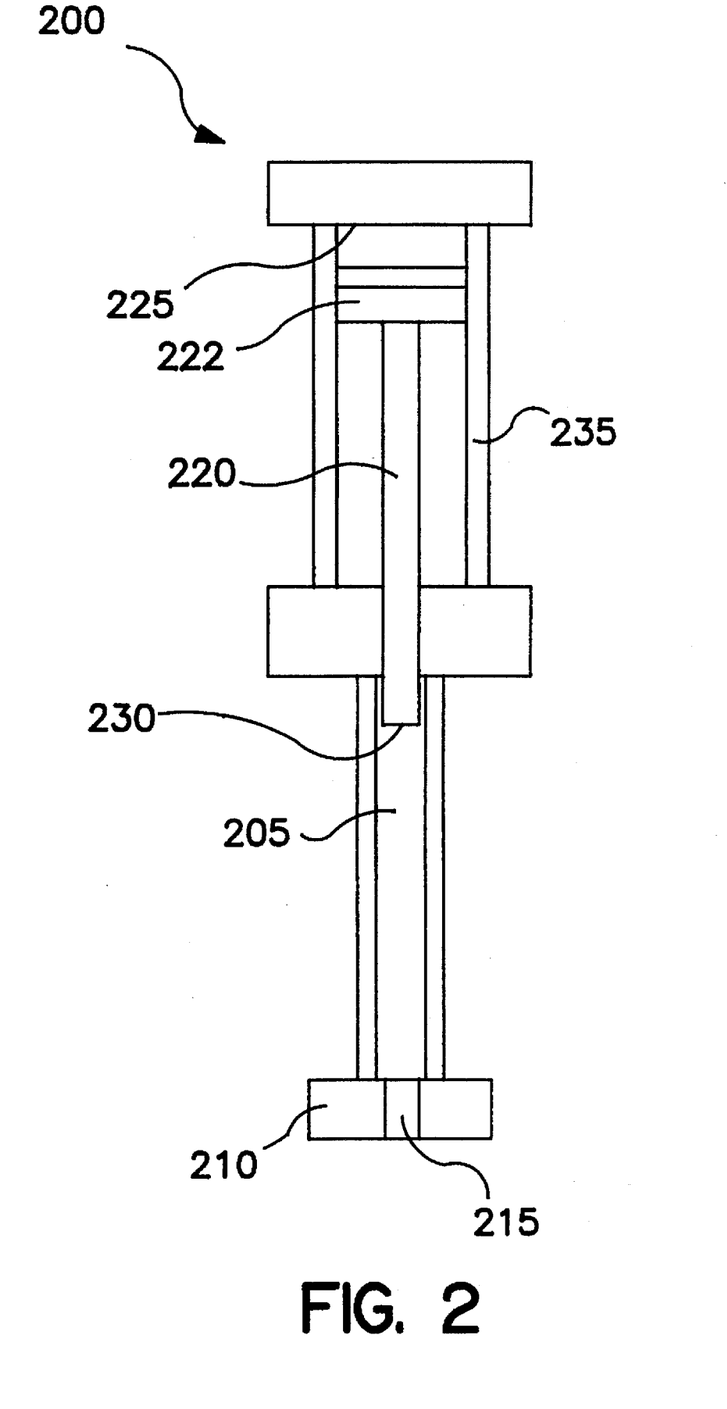
FIG. 2 illustrates a sectional view of a pressure chamber suitable for use in the present process and system.
Figure 3:
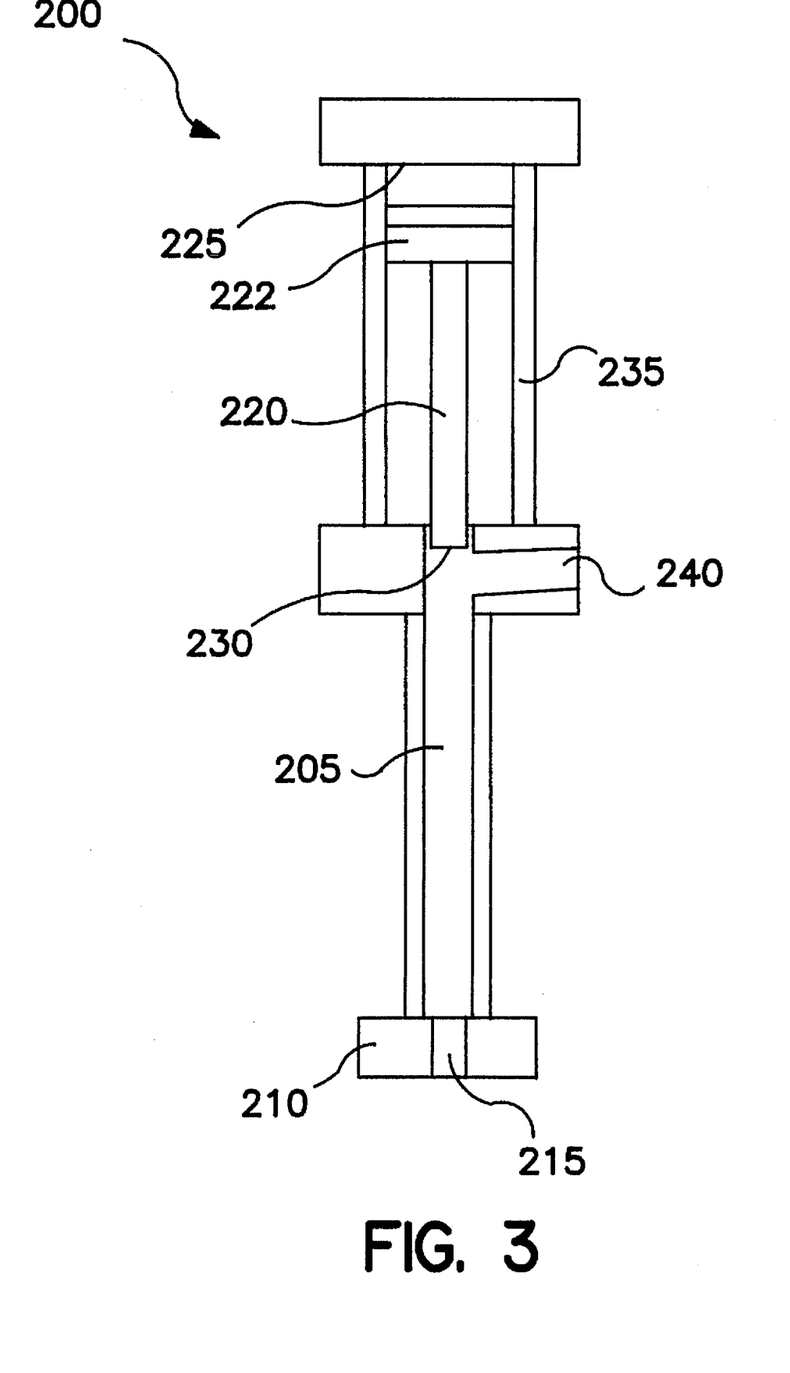
FIG. 3 illustrates a sectional view of a another pressure chamber suitable for use in the present process and system.

With reference to FIGS. 2 and 3, wherein like reference numerals are intended to depict like elements, there are illustrated alternate embodiments of intensifier 200. Thus, there is provided a pressure chamber 205 into which the free-flowing solids stream (not shown) is loaded. Intensifier 200 is provided with an outlet cap 210 comprising an outlet 215. Outlet 215 is connected to mixhead 100 via a high pressure line (not shown). Compressive forces in pressure chamber 205 are generated by compression piston 220. Compression piston 220 comprises a piston head 222, a driving surface 225 and a working surface 230. Piston head 222 operates is in sealed communication with and operates within a hydraulic chamber 235. Hydraulic fluid is introduced into hydraulic chamber 235 above driving surface 225 by any suitable means (not shown in FIGS. 2 and 3). Such hydraulic force compression piston 220 generally downward such that working surface 230 compresses the contents of pressure chamber 205.

In the intensifier illustrated in FIG. 2, the free-flowing solids stream is introduced into pressure chamber 205 via outlet 215. In the intensifier illustrated in FIG. 3, the need to detach or separate components is obviated by provision of an entry port 240 which allows for loading of the free-flowing solids stream when compression piston 220 is retracted substantially completely into hydraulic chamber 235.

In operation, the free-flowing solids stream is introduced into pressure chamber 205. Hydraulic chamber 230 is pressurized by admission thereto of a suitable hydraulic fluid above driving surface 225. This pressurization forces compression piston 220 downward and results in pressurization of the solids stream in pressure chamber 205. The pressurized solids stream is then fed to mixhead 100.

As illustrated in FIGS. 2 and 3, the surface area of the driving surface 225 is greater than that of working surface 230 thereby providing a potential hydraulic ratio of greater than 1:1. The hydraulic ratio provided by intensifier 200 can be control by judicious selection of the surface area of each of driving surface 225 and working surface 230. Preferably, the respective surface areas are chosen to provide a hydraulic ratio in the range of from about 2:1 to about 10:1, more preferably from about 3:1 to about 7:1.

As discussed hereinabove, it is necessary to apply sufficient compressive forces in the pressure chamber such that a substantially linear relationship exists between the weight of the first stream passing through the mixhead and the period of impingement of that weight in the mixhead. Preferably, this involves measuring the weight of a sample of the first stream impinged in the mixhead for a series of predetermined time periods and confirming a linear relationship between the weight of the first stream and the time period for impingement thereof.

With reference to FIGS. 4–7, wherein like reference numerals are intended to depict like elements, there is illustrated various sectional view of mixhead 100. Mixhead 100 receives the first liquid stream via a first inlet 105 connected to line 17 and the second liquid stream via a second inlet 115 connected to line 42. Mixhead 100 receives the solids stream from intensifier 200 via a third inlet 125 connected to line 8.

Mixhead 100 further comprises a hydraulic chamber 130, a mixing chamber 135 and a control plunger 140 operable therebetween. Hydraulic chamber is connected a source of hydraulic fluid (not shown) which acts on the upper surface of control plunge 140 allow stroked operation thereof.

Figure 4:
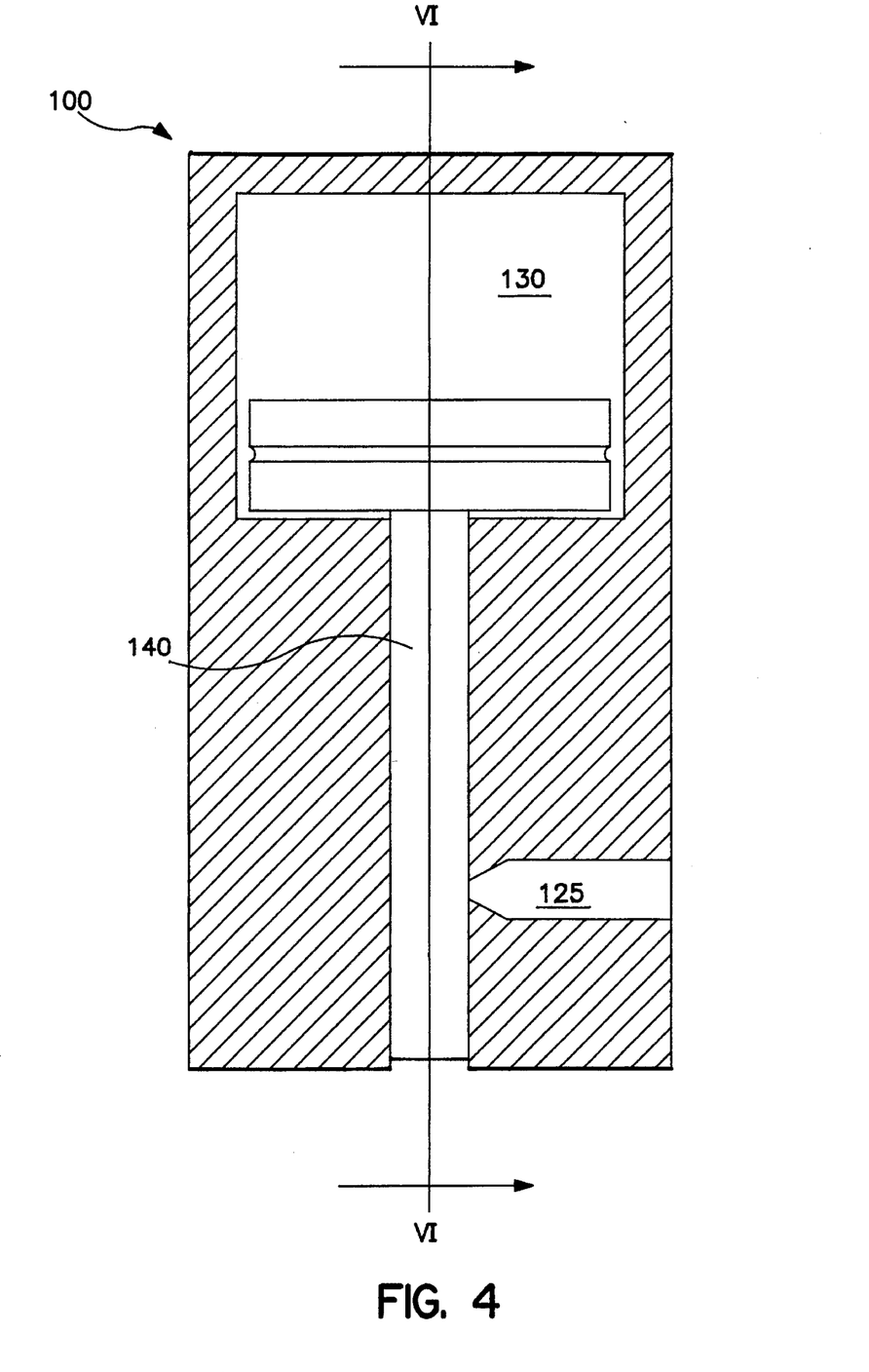
FIG. 4 illustrates a sectional view of a mixing device in a closed position suitable for use in the present process and system.
Figure 6:
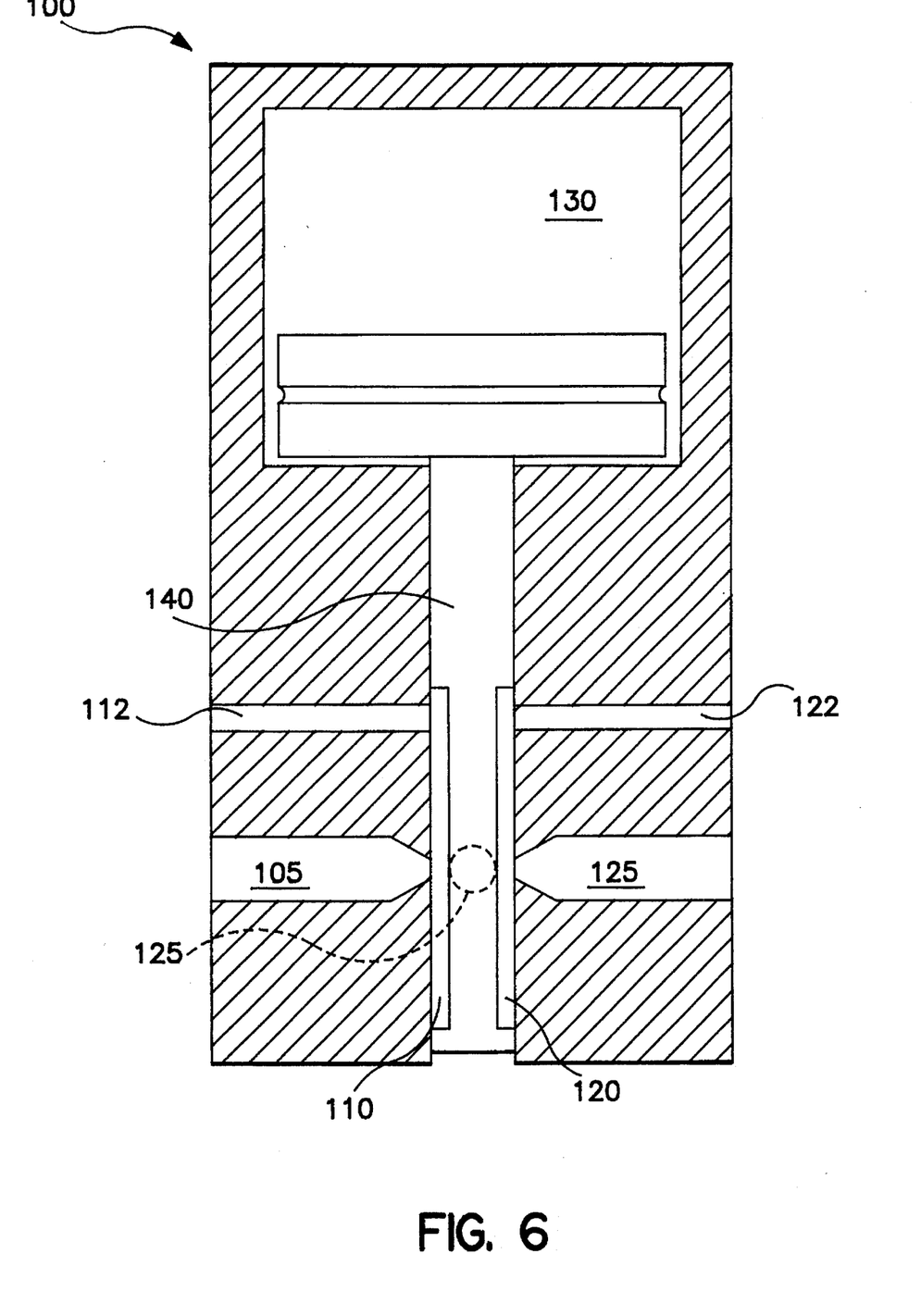
FIG. 6 illustrates a sectional view along line VI—VI in FIG. 4.

FIGS. 4 and 6 depict mixhead 100 in the non-use or closed position. Thus, hydraulic chamber 130 is pressurized thereby drive control plunger 140 down. In this position the solids stream fed into third inlet 125 is dead-ended or dead-headed against control plunger 140. As shown in FIG. 6, control plunger 140 comprises a first recirculation groove 110 which is in communication with first inlet 105 and a first outlet 112 connected to first return line 30. Further, control plunger 140 comprises a second recirculation groove 120 which is in communication with second inlet 115 and a second outlet 122 connected to second return line 45.

Thus, in the non-use or closed position of mixhead 100, the first liquid stream is fed at high pressure, enters first input 105, enters first recirculation groove 110, enters first outlet 112 and is returned to first holding tank 10 via first return line 30. The second liquid stream is fed at high pressure, enters second input 115, enters second recirculation groove 120, enters second outlet 122 and is returned to second holding tank 20 via second return line 45. Solids stream enters mixhead 100 via third inlet 125 and is dead-ended or dead-headed against control plunger 140.

Figure 5:
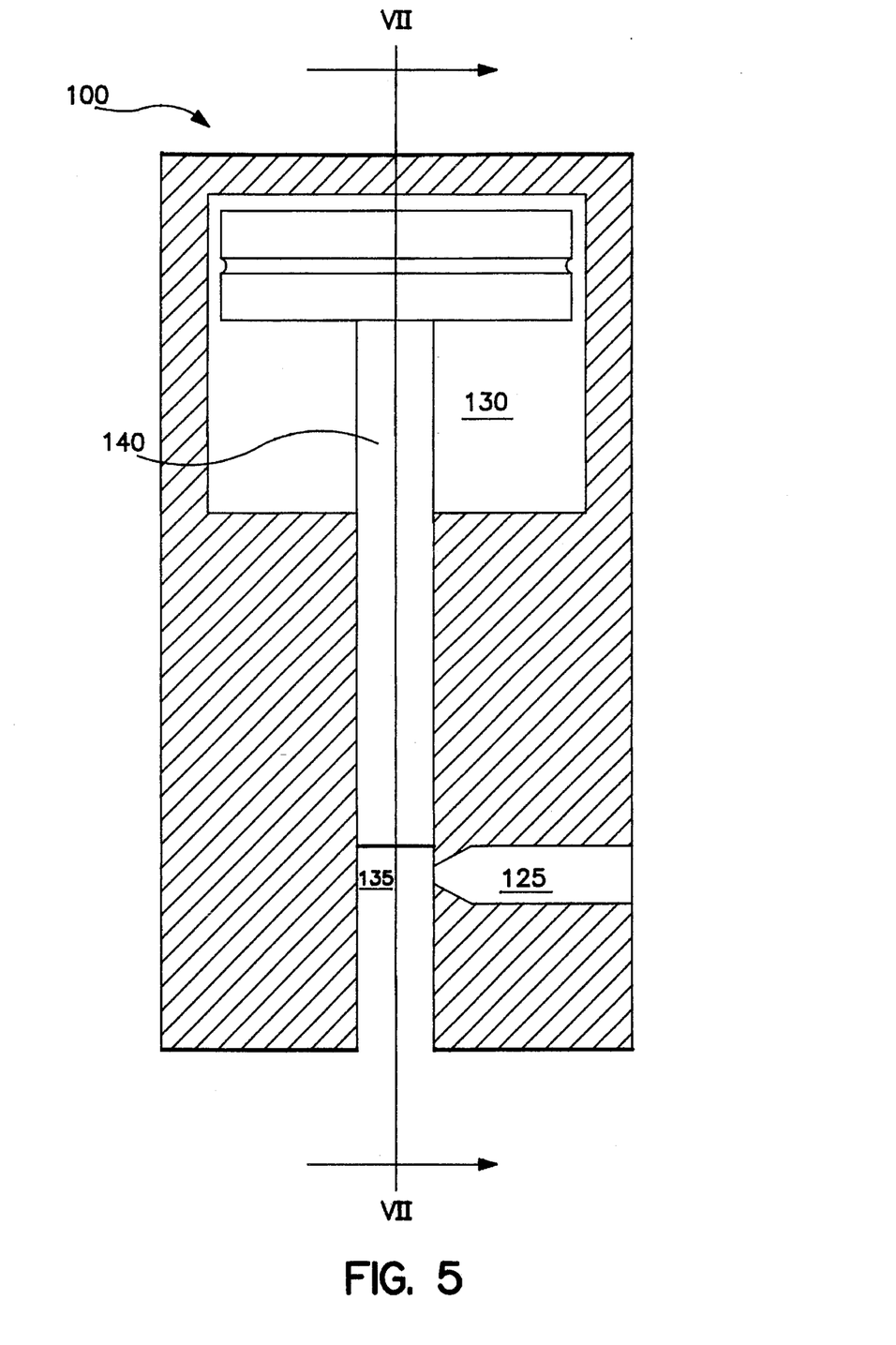
FIG. 5 illustrates the mixing device of FIG. 4 in an open position.
Figure 7:
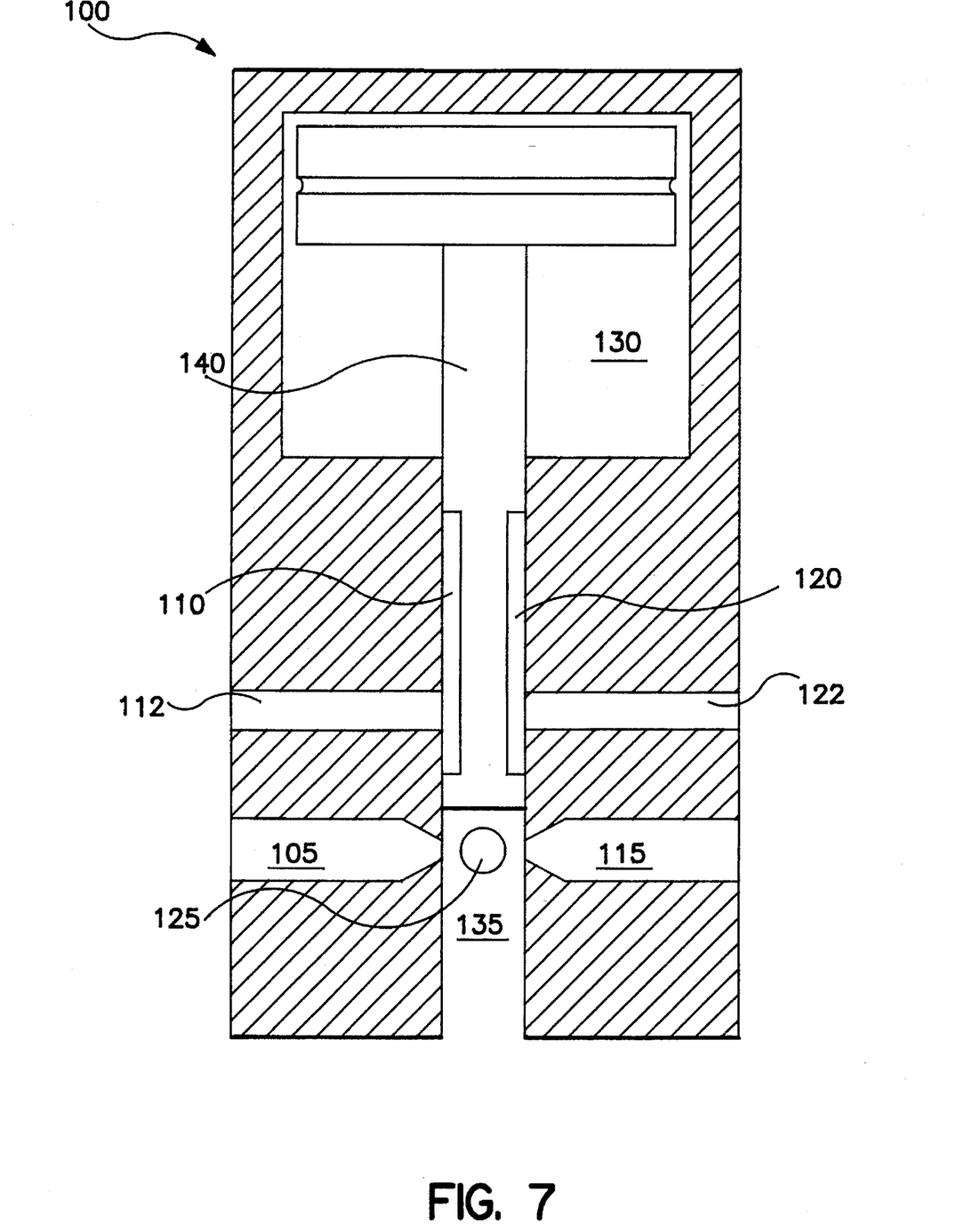
FIG. 7 illustrates a sectional view along line VII—VII in FIG. 5.

When it is desired to mix the streams, hydraulic chamber 130 is de-pressurized above control plunger 140 resulting in control plunger 140 moving to a retracted position as illustrated in FIGS. 5 and 7. In this position, the first liquid stream emanates from first inlet 105, the second inlet stream emanates from second inlet 115 and the solids stream emanates from third inlet 125. The streams impinge on one another in mixing chamber 135 resulting in production of an intimate mixture. The intimate mixture is then discharged from mixhead 100 in a mold or other shaping device. When sufficient amounts of the streams have been dispensed, hydraulic chamber 130 is pressurized above control plunger 140 resulting in control plunger 140 moving to the extend position illustrated in FIGS. 4 and 6.

Figure 8:
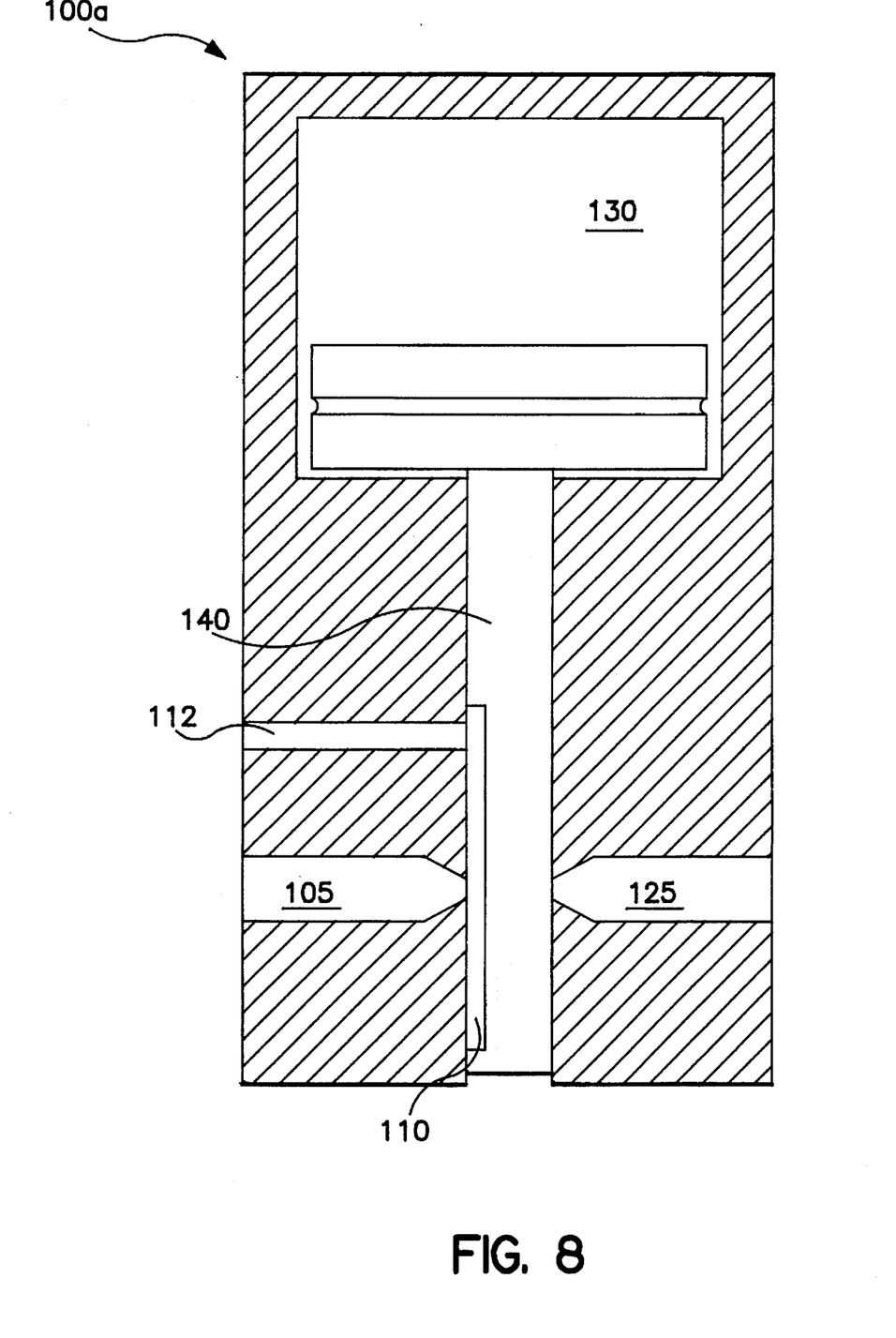
FIG. 8 illustrates a sectional view of another mixing device in a closed position suitable for use in the present process and system.
Figure 9:
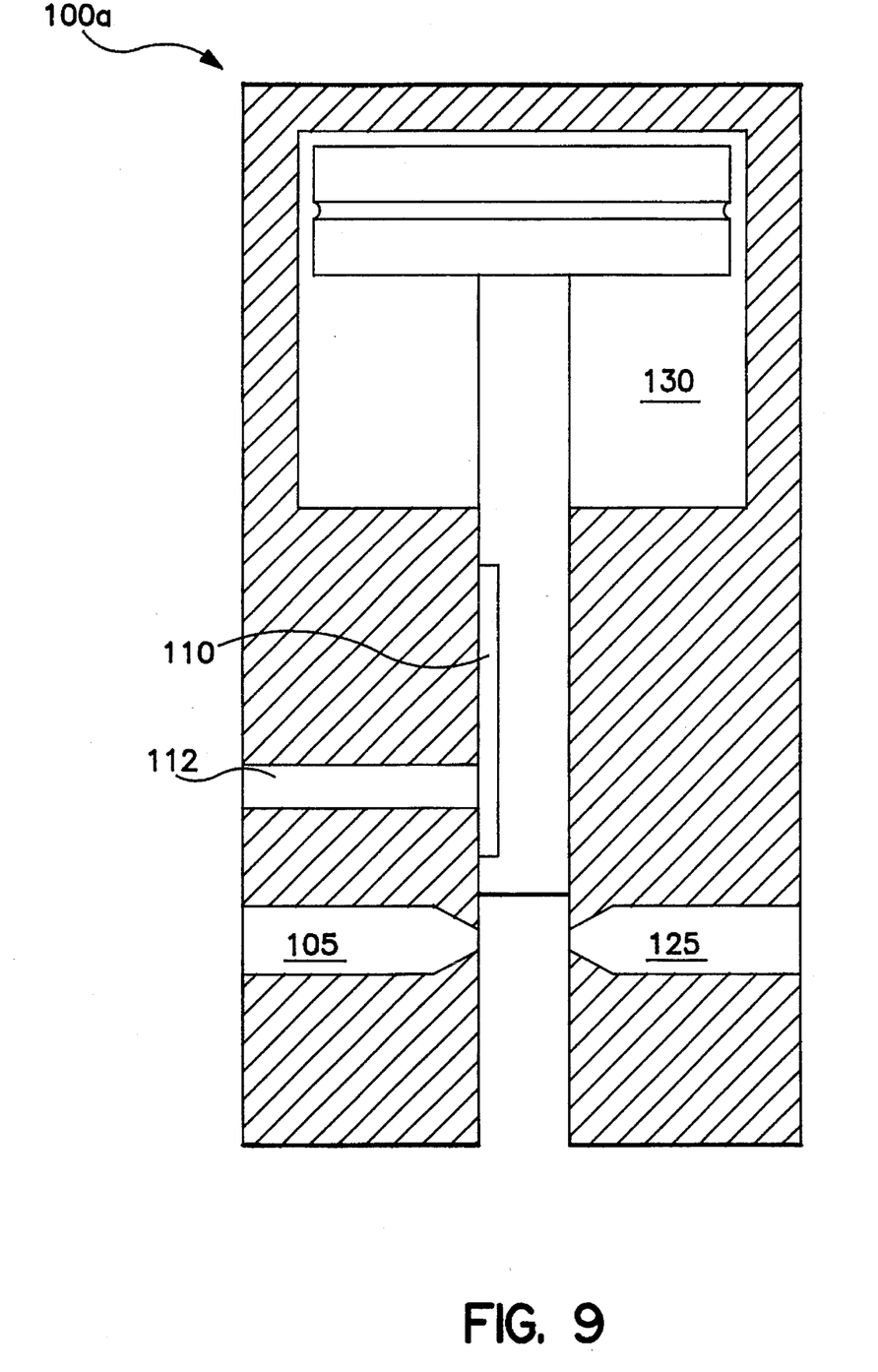
FIG. 9 illustrates the mixing device of FIG. 8 in an open position.

With reference to FIGS. 8 and 9, there is illustrated a variation of the mixhead illustrated in FIG. 4–7. Specifically, in FIGS. 8 and 9, a mixhead 100*a* is provided for mixing a first liquid stream with a solids stream—i.e. there is no second liquid stream. The operation of mixhead 100*a* is similar to that of 100.

As will be appreciated by those of skill in the art, many variations of the disclosed process and system are possible without deviating from the spirit and substance thereof. For example, those of skill in the sat will readily appreciate that the present system and process can be used with multiple solids streams and multiple liquid streams. When producing a filled foamed isocyanate-based polymer, it is possible to use independent streams of isocyanate and active hydrogen-containing compound. Alternatively, it is possible to pre-blend the isocyanate and active hydrogen-containing compounds and use a single stream of these or multiple streams thereof. Further, it is contemplated that the mixhead can be used with one or more quieting chambers and the like which are described in various of the United States patents described hereinabove. Still further, it will be appreciated by those of skill in the art that it is possible, and may be even preferred in some cues, to have the first input and second input (and, optionally, one or more other inputs, if present) in the mixing device disposed in the same plane or on different planes with respect to one another. When disposed on different planes the first input and the second input still provide impingement of the streams. The streams still impinge where they have a mixing effect on each other. For example, where the streams are on different planes, the planes may intersect or they may be parallel; if parallel, the streams may be in proximity so as to have a mixing effect.

The streams may also be deflected or directed (by structure or air pressure) to have the appropriate mixing effect.

Accordingly, while the invention has been described with reference to illustrative embodiments, the description is not intended to be construed in a limiting sense. Various modifications of the illustrative embodiments as well as other embodiments of the invention will be apparent to persons skilled in the art upon reference to this description. It is therefore contemplated that the appended claims will cover any such modifications or embodiments.

What is claimed is:

1. A process for mixing at least two independent streams in a mixing device having independent inputs for each of the at least two independent streams, the process comprising the steps of:
   (i) feeding a first stream, provided as a flee-flowing solids stream, to a pressure chamber;
   (ii) compressing the first stream in the pressure chamber;
   (iii) feeding the first stream to a first input in the mixing device;
   (iv) feeding a second stream to a second input in the mixing device;
   (v) impinging the first stream and the second stream on one another in a mixing device to produce a mixture; and
   (vi) dispensing the mixture from the mixing device;
   wherein the compressing in Step (ii) is conducted to achieve a substantially linear relationship between a weight of the first stream and a period of impingement of the weight in Step (v).

2. The process defined in claim 1, wherein Step (ii) is conducted at a pressure in the range of from about 2,000 to about 15,000 psi.

3. The process defined in claim 1, wherein Step (ii) is conducted at a pressure in the range of from about 3,000 to about 10,000 psi.

4. The process defined in claim 1, wherein Step (ii) is conducted at a pressure in the range of from about 3,000 to about 5,000 psi.

5. The process defined in claim 1, wherein Step (ii) is conducted in a hydraulic intensifier capable of providing a hydraulic ratio of at least about 1:1.

6. The process defined in claim 1, comprising the further step of feeding a third stream to a third input in the mixing device and wherein Step (v) comprises impinging the first stream, the second stream and the third stream on one another in a mixing to device to produce a mixture.

7. The process defined in claim 1, wherein the first stream comprises a particulate non-cellular filler material surrounded by a mixture comprising water and catalyst, and the second stream comprises a blend of an isocyanate and an active hydrogen-containing compound, and the process is for production of foamed isocyanate-based polymer.

8. The process defined in claim 7, wherein the filler material is used in an amount to provide a loading level less than about 70% by weight based on the weight of the foamed isocyanate-based polymer.

9. The process defined in claim 7, wherein the filler material is used in an amount to provide a loading level in the range of from about 20% to about 70% by weight based on the weight of the foamed isocyanate-based polymer.

10. The process defined in claim 7, wherein the filler material is used in an amount to provide a loading level in the range of from about 30% to about 60% by weight based on the weight of the foamed isocyanate-based polymer.

11. The process defined in claim 7, wherein the filler material is selected from the group consisting of ground polymer, ground sheet molding compound, ground reaction injected molded elastomer, ground reinforced reaction injected molded elastomer ground whole tire or a portion thereof, and ground isocyanate-based polymer foam.

12. A system for mixing at least two independent streams in a mixing device having independent inputs for each of the at least two independent streams, the system comprising:
   a mixing device having a first input and a second input, the first input capable of receiving a first stream and the second input capable of receiving a second stream, and impingement means for allowing the first stream and second stream to impinge on one another for a period to time;
   a compression chamber upstream of the mixing device, the compression chamber comprising: (i) an input for receiving the first stream as a free-flowing solids stream, (ii) compression means to compress the first stream to achieve a substantially linear relationship between a weight of the first stream and the period of time; and (iii) an output for allowing exit of the first stream from the compression chamber;
   connection means to connect the output of the compression chamber to the first input in the mixing device.

13. The system defined in claim 12, wherein the compression means comprises a piston, a working surface which compresses the first stream, and a driving surface which is in communication with drive means to translate the piston.

14. The system defined in claim 13, wherein the compression means is capable of conveying a hydraulic ratio, defined as the ratio of the area of the driving surface to the area of the working surface, of at least 1:1.

15. The system defined in claim 13, wherein the compression means is capable of conveying a hydraulic ratio, defined as the ratio of the area of the driving surface to the area of the working surface, in the range of from about 2:1 to about 10:1.

16. The system defined in claim 13, wherein the compression means is capable of conveying a hydraulic ratio, defined as the ratio of the area of the driving surface to the area of the working surface, in the range of from about 3:1 to about 7:1.

17. The system defined in claim 12, wherein the compression means comprises a hydraulic pressure source.

18. The system defined in claim 12, wherein the compression chamber is integrated in a hydraulic intensifier.

19. The system defined in claim 12, wherein the mixing device comprises a mixing chamber in communication with the first input and the second input.

20. The system defined in claim 19, wherein the mixing device comprises a control plunger disposed in mixing chamber, the control plunger operable in: (i) a retracted position to allow the first stream and second stream to impinge on one another in the mixing chamber, and (ii) an extended position which prevents entry of the first stream and the second stream into the mixing chamber.

21. The system defined in claim 20, wherein the control plunger comprises a recirculation passage which is in communication with the second input when the control plunger is in the extended position allowing for recirculation of the second stream through the mixing device.

22. The system defined in claim 20, wherein in the extended position, the control plunger is capable of deadending the first stream.

23. The system defined in claim 12, wherein the mixing device further comprises a third input for receiving a third stream.

24. The system defined in claim 23, wherein the mixing device comprises a mixing chamber in communication with the first input, the second input and the third input.

25. The system defined in claim 24, wherein the mixing device comprises a control plunger disposed in mixing chamber, the control plunger operable in: (i) a retracted position to allow the first stream, the second stream and the third stream to impinge on one another in the mixing chamber, and (ii) an extended position which prevents entry of the first stream, the second stream and the third stream into the mixing chamber.

26. The system defined in claim 25, wherein in the extended position, the control plunger is capable of dead-ending the first stream.

27. The system defined in claim 24, wherein the control plunger comprises an independent recirculation passage which is in communication with each of the second input and the third input when the control plunger is in the extended position allowing for recirculation of the second stream and the third stream through the mixing device.

* * * * *